United States Patent
Nagayoshi (10) Patent No.: US 7,237,903 B2
(45) Date of Patent: Jul. 3, 2007

(54) VIDEO PROJECTOR AND METHOD FOR SHIFTING PROJECTED PICTURE

(75) Inventor: Takahiro Nagayoshi, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 288 days.

(21) Appl. No.: 11/043,266

(22) Filed: Jan. 27, 2005

(65) Prior Publication Data

US 2005/0168698 A1    Aug. 4, 2005

(30) Foreign Application Priority Data

Jan. 30, 2004    (JP)    ............. 2004-024658

(51) Int. Cl.
| | |
|---|---|
| G03B 21/26 | (2006.01) |
| G03B 21/00 | (2006.01) |
| G03B 21/14 | (2006.01) |
| H04N 3/223 | (2006.01) |
| H04N 3/227 | (2006.01) |

(52) U.S. Cl. ................ 353/30; 353/69; 353/121; 348/747

(58) Field of Classification Search .......... 353/30, 353/31, 69, 70, 121, 122; 348/746, 747; 345/204; 382/274

See application file for complete search history.

(56) References Cited

U.S. PATENT DOCUMENTS

2005/0146520 A1* 7/2005 Ikeda .................... 345/204

FOREIGN PATENT DOCUMENTS

JP    2003-084738    3/2003

* cited by examiner

Primary Examiner—Melissa Jan Koval
(74) Attorney, Agent, or Firm—Finnegan, Henderson, Farabow, Garrett & Dunner, L.L.P.

(57) ABSTRACT

A scaler unit writes an input video signal into a frame memory and scales the number of pixels of the input video signal to any number of pixels when the input video signal is read out from the frame memory. A display device displays a picture based on the video signal. A projection lens projects the picture displayed on the display device onto a screen. A control unit controls the scaler unit so as to scale the number of pixels of the input video signal to a smaller number of pixels than the maximum displayable number of pixels of the display device. The scaler unit shifts the picture displayed on the display device to a desired position in the displayable region on the display device by changing the timing of the vertical and horizontal superimposition of the video signal according to an instruction from an operating device.

5 Claims, 6 Drawing Sheets

VIDEO PROJECTOR AND METHOD FOR SHIFTING PROJECTED PICTURE

This application is based upon and claims the benefit of priority from the prior Japanese Patent Application No. 2004-24658 filed on Jan. 30, 2004; the entire contents of which are incorporated herein by reference.

BACKGROUND OF THE INVENTION

1. Field of the Invention

The present invention relates to a video projector that projects and displays a picture on a screen based on an input video signal, and more specifically, it relates to a video projector capable of adjusting the size and position of a projected picture, and a method for shifting the projected picture.

2. Description of the Related Art

Conventionally, in order to display a picture created with a computer on a display device included in a video projector such as a liquid crystal projector, it is necessary to generate a video signal corresponding to the resolution of the display device, and supply it to the display device.

Japanese Unexamined Patent Application Publication No. 2003-84738, for example, discloses an apparatus that can perform display regardless of the resolution of the input video signal. The apparatus measures the frequency of the synchronizing signals in the input video signal; determines the resolution of the video signal based on the measured frequency; and performs video scaling, that is to say, changes (scales) the determined resolution of the video signal so as to agree to the resolution of the display device, thus enabling to display it on the display device.

Such a video projector includes a video-signal processing unit for changing the input analog video signal to a digital video signal; a scaler unit for scaling the number of pixels of the digital video signal to the number of pixels of the display device; a display-device drive unit for making the display device display a picture based on the digital video signal; a display device, such as a liquid crystal panel, functioning as a light valve; a lamp for emitting light to the display device; and a projection lens for projecting the picture displayed on the display device onto a screen.

In the case where the display device is a transmissive panel such as a liquid crystal panel, the light emitted from the lamp is transmitted by the display device, is refracted by the projection lens, and forms a projection image on the screen. In the case where the display device is a reflective panel such as a DMD (trademark), the light emitted from the lamp is reflected by the display device, is refracted by the projection lens, and forms a projection image on the screen. DMD (trademark) is an abbreviation of digital micromirror device, and is used in DLP light processing technology. DLP (trademark) is an abbreviation of digital light processing.

If the projection lens is provided with a mechanism for shifting the lens in the direction of the axis of projection, an "optical zooming operation", which adjusts the size of the picture projected on the screen, can be performed.

If the projection lens is provided with a mechanism for shifting the lens in the direction perpendicular to the axis of projection, a "lens shifting operation", which adjusts the position of the picture projected on the screen, can be performed.

There are two modes of use for a video projector, that is to say, permanent installation in a room with a fixed screen and temporary installation in various places. Especially in the case of the temporary installation, it is preferable to expand the range of choice for installation places, that is to say, it is preferable that the video projector project a picture on a screen (or a wall used as a screen) regardless of the size, position, and distance of the screen.

As described above, the optical zooming operation adjusts the size of the picture projected on the screen; and the lens shifting operation adjusts the position of the picture projected on the screen. If the video projector has the mechanisms for the optical zooming and shifting operations, the range of choice for installation places is expanded.

However, since the lens shifting mechanisms are expensive, there is a need for a method for adjusting the size and position of the projected picture in another way.

SUMMARY OF THE INVENTION

It is an object of the present invention to provide a video projector capable of adjusting the size and position of the projected picture according to the user's operation without using lens-shifting mechanisms, thereby expanding the range of choice for installation places; and a method for shifting the projected picture.

In one aspect of the present invention, a video projector includes a scaler unit, a display device, a projection lens, and a control unit. The scaler unit writes an input video signal into a frame memory. The scaler unit is capable of scaling the number of pixels of the input video signal to any number of pixels when the input video signal is read out from the frame memory, and outputs the video signal. The display device displays a picture based on the video signal whose number of pixels is scaled by the scaler unit. The projection lens projects the picture displayed on the display device onto a screen. The control unit controls the scaler unit. The scaler unit scales the number of pixels of the input video signal to a smaller number of pixels than the maximum displayable number of pixels of the display device. The scaler unit shifts the picture displayed on the display device to a desired position in the displayable region on the display device by changing the timing of the vertical and horizontal superimposition of the video signal according to an instruction from an operating device so as to shift the picture projected on the screen.

In one aspect of the present invention, the scaler unit scales the number of pixels of the input video signal to a smaller number of pixels than the maximum displayable number of pixels of the display device, and shifts the picture displayed on the display device to a desired position in the displayable region on the display device, thereby shifting the picture projected on the screen. The size and position of the picture projected on the screen can be adjusted without using lens-shifting mechanisms. Therefore, the range of choice for installation places is expanded.

Since no lens shifting mechanisms are used, the cost is reduced. When the number of pixels of the video signal is scaled to a smaller number than that of the display device with the scaler unit, the picture displayed on the display device can be shifted. Since the size and position of the picture projected on the screen can be adjusted, the range of choice for installation places is expanded.

According to the other aspect of this invention, the video projector may further include a shifting mechanism capable of shifting the projection lens at least in the direction of the axis of projection or in the direction perpendicular to the axis of projection.

In this aspect, in addition to the digital zooming operation and the digital shifting operation performed by the scaler unit and the control unit, the optical zooming operation and the lens shifting operation are performed by combining the shifting mechanism. Therefore, the size and position of the picture projected on the screen can be adjusted over a wider range.

In the former aspect of the present invention, there is provided a method for shifting a picture projected on a screen by a video projector. The video projector includes a scaler unit and a display device. The scaler unit is capable of scaling the number of pixels of an input video signal to any number of pixels. The display device functions as a light valve and displays a picture based on the video signal whose number of pixels is scaled by the scaler unit. The method comprises the adjustment of the number of pixels of the input video signal to a smaller number of pixels than the maximum displayable number of pixels of the display device so as to adjust the size of the picture projected on the screen; and the adjustment of the position of the picture projected on the screen by the adjusted picture displayed on the display device to a desired position in the displayable region on the display device.

Since no lens shifting mechanisms are used, the cost is reduced. When the number of pixels of the video signal is made smaller than that of the display device with the scaler unit, the picture displayed on the display device can be shifted. Since the size and position of the picture projected on the screen can be adjusted, the range of choice for installation places is expanded.

BRIEF DESCRIPTION OF THE DRAWINGS

FIG. 1A shows the case where the number of pixels of the video signal is scaled by a scaler unit to the number of pixels of a display device. FIG. 1B shows the case where the number of pixels of the video signal is scaled by the scaler unit to a smaller number of pixels than the number of pixels of the display device. FIG. 1C shows the case where the number of pixels of the video signal is scaled by the scaler unit to a smaller number of pixels than the number of pixels of the display device, and the picture is shifted.

FIG. 4A shows the case where the full screen mode (N=1.28) is selected. FIG. 4B shows the case where the size scaling mode (N=1) is selected. FIG. 4C shows the case where the size scaling mode (N=1) is selected, and the picture is shifted.

FIGS. 5A to 5F are timing charts in an output timing generator illustrating the display operation in FIG. 4B.

FIGS. 6A to 6F are timing charts in the output timing generator illustrating the display operation in FIG. 4C.

FIGS. 7A to 7C are block diagrams showing an outline of the structure of a video projector of a second embodiment of the present invention.

DESCRIPTION OF THE PREFERRED EMBODIMENTS

The preferred embodiments of the present invention will now be described with reference to the drawings.

First Embodiment

Figure 1A:
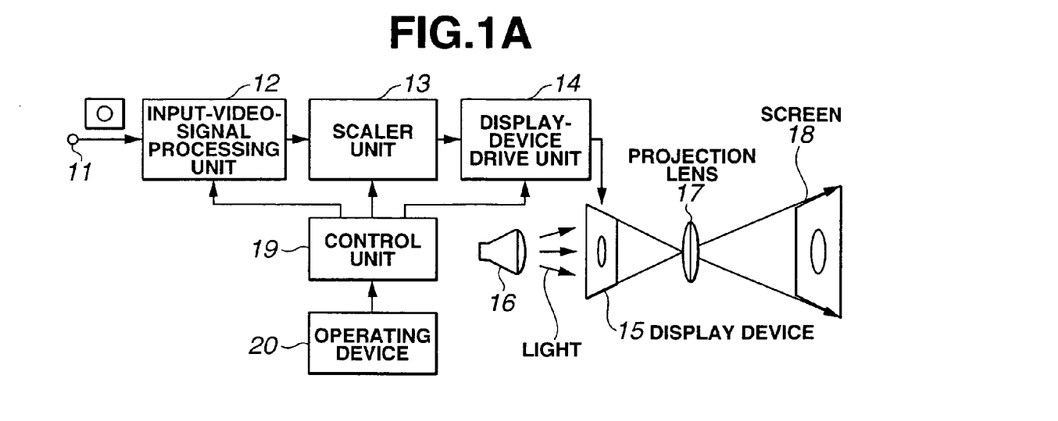
FIGS. 1A to 1C are block diagrams showing an outline of the structure of a video projector of a first embodiment of the present invention.
Figure 1B:
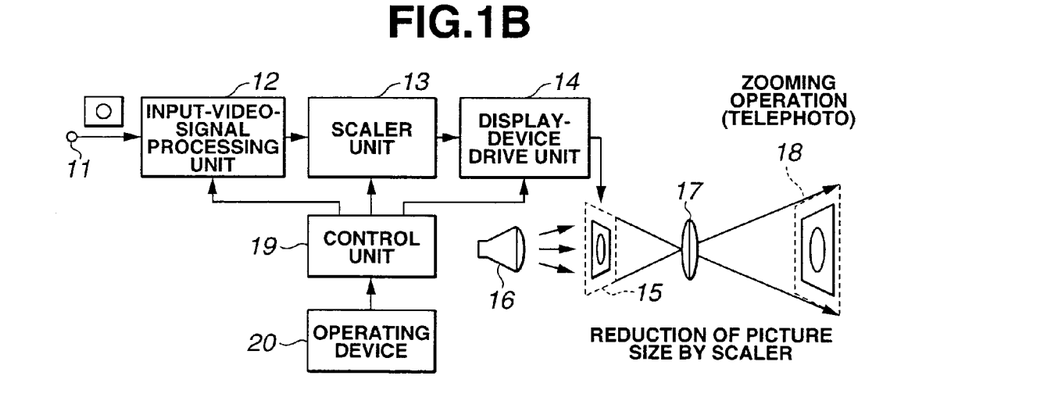
Figure 1C:
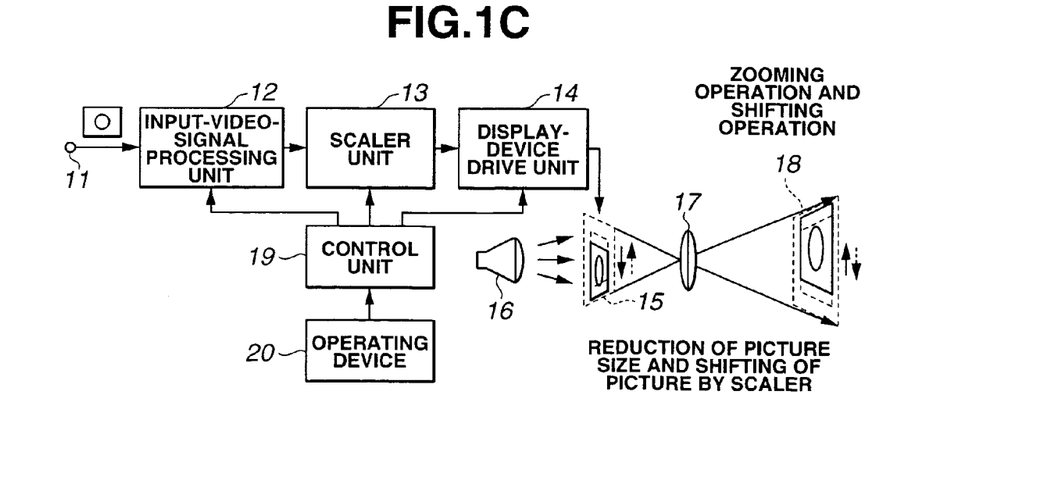

FIGS. 1A to 1C are block diagrams showing an outline of the structure of a video projector of a first embodiment of the present invention.

In FIGS. 1A to 1C, an analog video signal is input into an input terminal 11 to be supplied to an input-video-signal processing unit 12. The input-video-signal processing unit 12 has an A/D converter, which converts the input analog signal into a digital signal. The digital video signal from the input-video-signal processing unit 12 is supplied to a scaler unit 13. The scaler unit 13 scales the number of pixels of the digital video signal from the input-video-signal processing unit 12 to the number of pixels of a display device 15 or a smaller number of pixels.

Incidentally, the scaler unit 13 can scale the number of pixels of the digital video signal from the input-video-signal processing unit 12 to a larger number of pixels than the number of pixels of the display device 15. That is to say, the scaler unit 13 can increase the number of pixels by interpolation based on the pixels around a pixel. However, in this case, the entire picture cannot be displayed on the display device. Therefore, normally, the scaler unit 13 does not scale the number of pixels of the digital video signal from the input-video-signal processing unit 12 to a larger number of pixels than the number of pixels of the display device 15.

The digital video signal whose number of pixels is scaled by the scaler unit 13 is input into a display-device drive unit 14. The display-device drive unit 14 is composed of horizontal and vertical drivers. The display-device drive unit 14 supplies the display device 15 with the digital video signal scaled by the scaler unit 13 to the number of pixels of the display device or a smaller number of the pixels to make the display device 15 display the picture. The display device 15 is a liquid crystal panel or a DMD (trademark). By emitting light to this display device 15 from a lamp 16, the device 15 functions as a light valve. By emitting light to this display device 15 from the lamp 16, the picture displayed on the display device 15 is light-modulated. The picture is then expanded by a projection lens 17 and projected on a screen 18.

In the case where the display device 15 is a transmissive panel such as a liquid crystal panel, the light emitted from the lamp 16 is transmitted by the display device 15, is refracted by the projection lens 17, and forms a projection image on the screen 18. In the case where the display device 15 is a reflective panel such as a DMD (trademark), the light emitted from the lamp 16 is reflected by the display device 15, is refracted by the projection lens 17, and forms a projection image on the screen 18.

Incidentally, the DMD (trademark) is an optical semiconductor chip that is at the heart of the digital light processing (DLP (trademark)) technology provided by Texas Instruments Incorporated. The chip has about 500,000 to 1,310,000 microscopic mirrors modulating light and mounted on a standard logic device. The mirrors reflect the light from the lamp to project it on the screen. A DMD is an abbreviation of digital micromirror device.

FIG. 1A shows the case where the number of pixels of the digital video signal is scaled by the scaler unit 13 to the number of pixels of the display device 15. FIG. 1B shows the case where the number of pixels of the digital video signal is scaled by the scaler unit 13 to a smaller number of pixels than the number of pixels of the display device 15. It is possible that the number of pixels of the input digital video signal is smaller than the number of pixels of the display device 15, and the number of pixels of the input digital video signal is increased by the scaler unit 13. Even in this case, however, the number of pixels of the input digital video signal needs to be scaled by the scaler unit 13 to a smaller number of pixels than the number of pixels of the display device 15. FIG. 1C shows the case where the number of pixels of the digital video signal is scaled by the scaler unit 13 to a smaller number of pixels than the number of pixels of the display device 15, and the picture is shifted.

As shown in FIG. 1A, when the number of pixels of the digital video signal is scaled by the scaler unit 13 to the number of pixels of the display device 15, the projected picture can fill the screen 18.

As shown in FIG. 1B, when the number of pixels of the digital video signal is scaled by the scaler unit 13 to a smaller number of pixels than the number of pixels of the display device 15, a "digital zooming operation" can be performed, that is to say, the size of the picture projected on the screen 18 can be adjusted. In the digital zooming operation, the number of pixels of the digital video signal is scaled to a smaller number of pixels than the number of pixels of the display device 15, and the reduced picture is displayed in a predetermined position (the central position or another fixed position) on the display device 15.

FIG. 1C illustrates the most characteristic operation in the first embodiment. As shown in FIG. 1C, the number of pixels of the digital video signal is scaled by the scaler unit 13 to a smaller number of pixels than the number of pixels of the display device 15, and the reduced picture is displayed in the central position (or another fixed position) on the display device 15; thereafter, the user can move the reduced picture to a desired position on the display device 15 by operating an operating device 20, such as an infrared remote control, to control the scaler unit 13. In this way, a "digital shifting operation", that is to say, vertical and horizontal shifting of the picture projected on the screen 18 is achieved.

Figure 2:
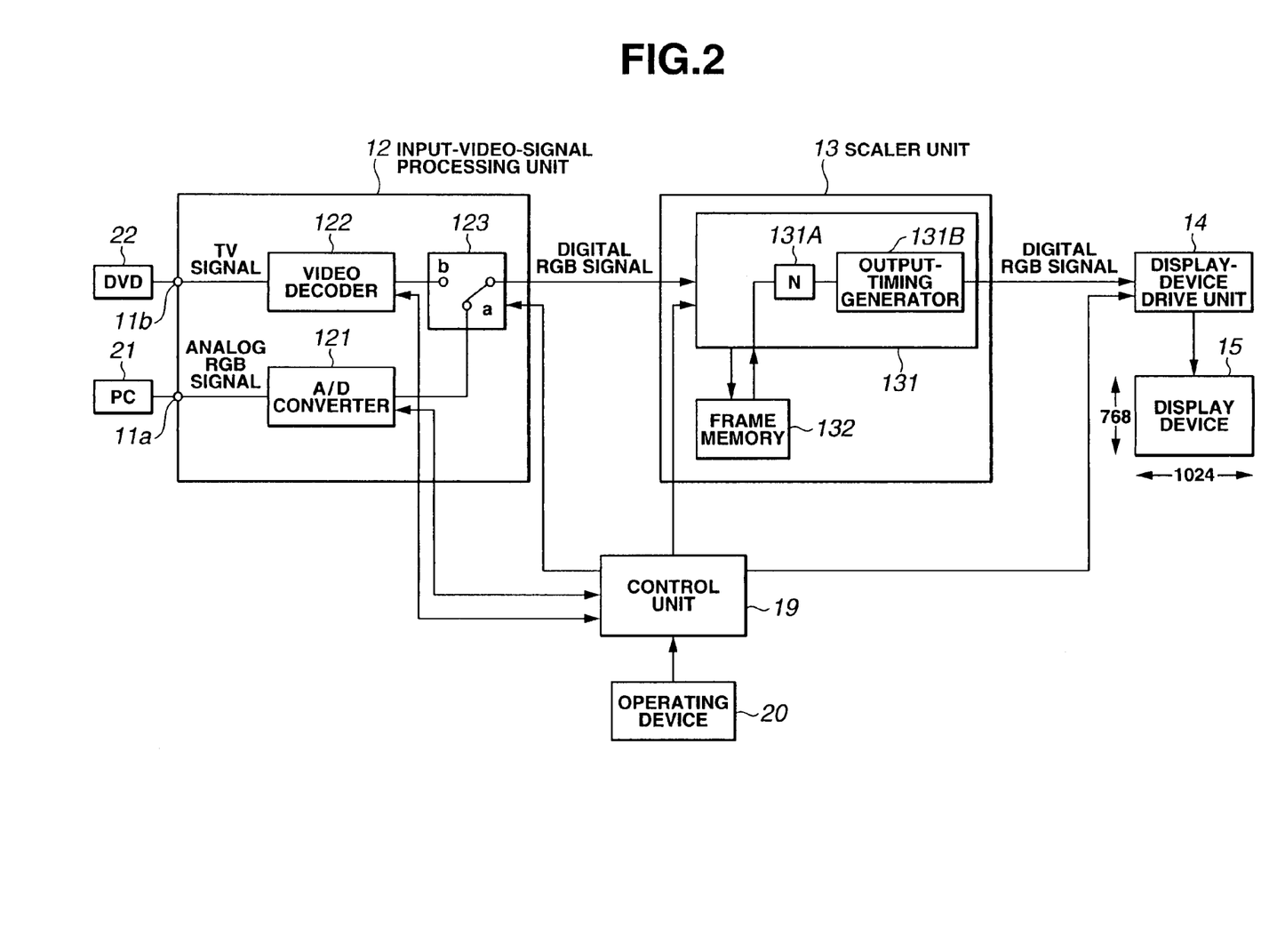
FIG. 2 is a block diagram showing, in more detail, the structure of the main part of the video projector in FIGS. 1A to 1C.

FIG. 2 is a block diagram showing, in more detail, the structure of the main part of the video projector in FIGS. 1A to 1C.

In FIG. 2, the input-video-signal processing unit 12 has two input terminals 11a and 11b. The input terminals 11a and 11b are connected to a personal computer (hereinafter referred to as PC) 21 and a DVD player 22, respectively. The PC 21 outputs an analog RGB signal. The analog RGB signal is converted by an A/D converter 121 into a digital RGB signal. The digital RGB signal is input into an input terminal a of a switching circuit 123. The DVD player 22 outputs an analog television signal (hereinafter referred to as analog TV signal). The analog TV signal is converted by a video decoder 122 into a digital RGB signal. The digital RGB signal is input into the other input terminal b of the switching circuit 123.

The control unit 19 is a microcomputer, and it performs control operation according to the program stored in the ROM therein. The control unit 19 counts the number of picture data items (pixel data) in the horizontal period with a determining device provided in the A/D converter 121, thereby determining the number of pixels (product of the horizontal number of pixels and the vertical number of pixels) of the video signal input from the PC 21, that is to say, the resolution of the input video signal. In addition, the control unit 19 measures the number of vertical lines and the frequencies of the horizontal and vertical synchronizing signals with another determining device provided in the video decoder 122, thereby determining the number of pixels (product of the horizontal number of pixels and the vertical number of pixels) of the video signal input from the DVD player 22, that is to say, the resolution of the input video signal. Moreover, the control unit 19 makes the switching circuit 123 perform switching according to the user's operation of the operating device 20.

The digital RGB signal from the switching circuit 123 is input into the scaler unit 13.

Hereinafter, in order to simplify the description, it is assumed that the digital RGB signal from the PC 21 is chosen in the switching circuit 123.

Figure 3:
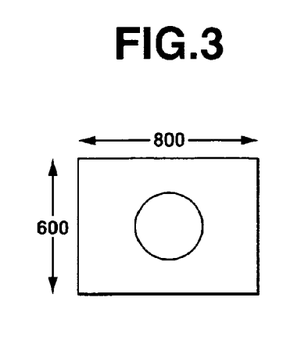
FIG. 3 shows the number of pixels (picture size) of the SVGA signal, which is an example of the video signals input into an input-video-signal processing unit.

In addition, it is assumed that the PC 21 outputs the SVGA signal having a number of pixels equal to 800×600 dots, as shown in FIG. 3, and the maximum number of pixels that the display device 15 can display is the XGA-size of 1024×768 dots. In this case, in order to fill the display device 15 with the video signal from the PC 21, it is necessary to multiply the number of pixels by 1.28 in both the horizontal and vertical directions.

The scaler unit 13 has a scaler 131 and a frame memory 132. The scaler 131 has a first function and a second function. The first function is to adjust the size of the picture projected on the screen (not shown) by scaling the number of pixels of the input digital RGB signal. The second function is carried out when the number of pixels of the input digital RGB signal is scaled by the first function to a smaller number of pixels than the number of pixels of the display device 15. The second function is to shift the picture projected on the screen (not shown) by moving the picture displayed on the display device 15 to a desired position according to the user's instruction via the operating device 20. The frame memory 132 has a capacity capable of storing at least one frame of the input digital RGB signal.

The scaler 131 and the frame memory 132 constitute a frame-rate converter capable of converting the frequency of the output digital RGB signal to a frequency suitable for the display device 15 regardless of the frequency of the input digital RGB signal.

The scaler 131 has an N-multiplying circuit 131A and an output timing generator 131B. The N-multiplying circuit 131A scales (increases or decreases) the number of pixels of the digital RGB signal by interpolation or pixel skipping when the input digital RGB signal is read out from the frame memory 132, thereby multiplying the number of pixels of the digital RGB signal displayed on the display device 15 by N. In the case of expansion, N>1, and in the case of reduction, 0<N<1. The output timing generator 131B moves the picture displayed on the display device 15 to a desired position in the displayable region on the display device 15 under the control of the control unit 19 based on the user's instruction via the operating device 20 when the number of pixels of the input digital RGB signal is scaled by the N-multiplying circuit 131A to a smaller number of pixels than the maximum displayable number of pixels of the display device 15, thereby shifting the picture projected on the screen (not shown). In the case where the resolution of the display device 15 is XGA (1024×768 dots), the output timing generator 131B is caused by the control unit 19 to constantly output the XGA-sized signal even if the number of pixels of the picture is multiplied by N by the N-multiplying circuit 131A. Incidentally, "to multiply by N" in the above description includes the case where N=1, that is to say, the number of pixels is unchanged. The operation of the scaler 131 will hereinafter be described with reference to FIG. 5.

The XGA-sized digital RGB signal output from the scaler unit 13 is input into the display-device drive unit 14.

Under the control of the control unit 19, and by using the input digital RGB signal, the display-device drive unit 14 drives the display device 15, which is constituted of an XGA-sized liquid crystal panel, to perform display. Since the control unit 19 already knows the resolution of the display device 15, the control unit 19 only performs the display-device drive unit 14 predetermined display control suitable for the resolution of the display device 15.

Figure 4A:
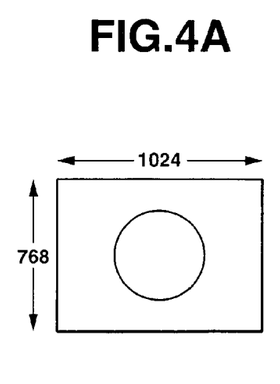
FIGS. 4A to 4C illustrate the pictures that can be displayed on the XGA-sized display device when the SVGA-sized video signal shown in FIG. 3 is input.
Figure 4B:
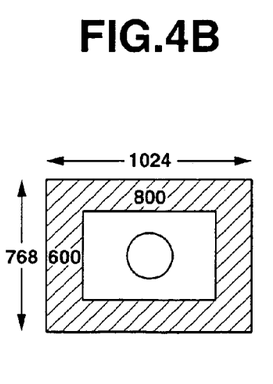
Figure 4C:
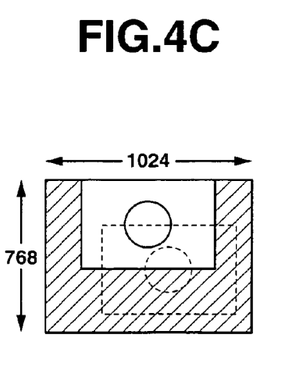

FIGS. 4A to 4C illustrate the pictures that can be displayed on the XGA-sized display device 15 in FIG. 2 when the SVGA-sized (800×600 dots) video signal shown in FIG. 3 is input from the PC 21. The case where the number of pixels is unchanged (that is to say, N=1) will be included in the description with reference to FIGS. 4A to 4C.

FIG. 4A shows the case where the full screen mode (N=1.28) is chosen by the operating device 20. In this case, N is set to 1.28 in the N-multiplying circuit 131A; the N-multiplying circuit 131A changes the SVGA-sized video signal from the PC 21 to the XGA-sized video signal by multiplying the number of pixels by 1.28 both in the horizontal direction and the vertical direction; and the output timing generator 131B automatically makes the XGA-sized video signal fill the XGA-sized display device 15.

FIG. 4B shows the case where the size scaling mode (N=1) is selected by the operating device 20. In this case, N is set to 1 in the N-multiplying circuit 131A; the N-multiplying circuit 131A does not change the SVGA-sized video signal from the PC 21; and the output timing generator 131B superimposes the unchanged SVGA-sized video signal on the XGA-sized black signal so as to place the video signal part at the center of the XGA-sized display device 15. The XGA-sized black signal and the horizontal and vertical synchronizing signals are generated in the output timing generator 131B. The shaded part is the black signal part.

Although FIG. 4B shows the case where N=1, more generally, in the case where the number of pixels of the input video signal is scaled to a smaller number of pixels than the number of pixels of the display device 15, the control unit 19 controls the output timing generator 131B so that the picture part is disposed in the center of the display device 15.

FIG. 4C shows the case where the size scaling mode (N=1) is selected by the operating device 20, and the picture is shifted using the arrow keys (upward, downward, rightward, and leftward) of the operating device 20. In this case, N is set to 1 in the N-multiplying circuit 131A; the N-multiplying circuit 131A does not change the SVGA-sized video signal from the PC 21; the output timing generator 131B superimposes the unchanged SVGA-sized video signal on the XGA-sized black signal so as to place the video signal part at the center of the XGA-sized display device 15; and then the picture part is shifted with the arrow keys so as to be located in the upper center of the display device 15. The shaded part is the black signal part. With the arrow keys of the operating device 20, the picture based on the SVGA-sized video signal can be moved to any position on the display device 15, for example, to the lower right position shown with the dotted line in FIG. 4C.

Next, the displaying operation in FIGS. 4B and 4C will be described with reference to the timing charts of the output timing generator 131B shown in FIGS. 5A to 5F and 6A to 6F. The number of pixels of the input digital video signal supplied to the output timing generator 131B is herein assumed to be a smaller number of pixels than the displayable number of pixels of the display device 15.

FIGS. 5A to 5F are timing charts in the output timing generator 131B illustrating the displaying operation in FIG. 4B.

Figure 5A:
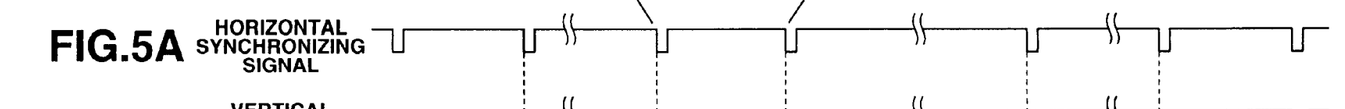
FIG. 5A shows the horizontal synchronizing signal.
Figures 5B, 5C:
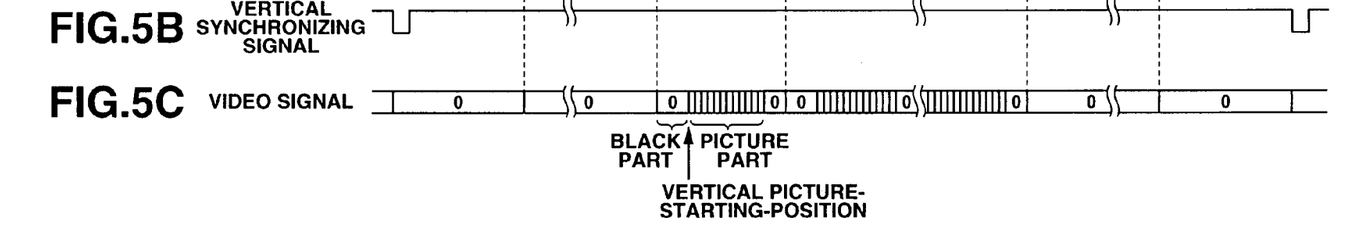
FIG. 5B shows the vertical synchronizing signal.
FIG. 5C shows the video signal.

FIGS. 5A to 5C illustrate the vertical timing in which the video signal is superimposed on the black signal (denoted by '0') generated in the output timing generator 131B. FIG. 5A shows the horizontal synchronizing signal generated in the output timing generator 131B. FIG. 5B shows the vertical synchronizing signal generated in the output timing generator 131B. FIG. 5C shows the video signal superimposed on the black signal (denoted by '0') generated in the output timing generator 131B. The arrow indicates the vertical picture-starting-position.

Figure 5D:
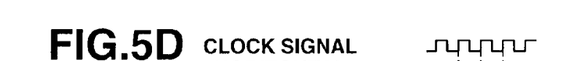
FIG. 5D shows the clock signal.
Figures 5E, 5F:
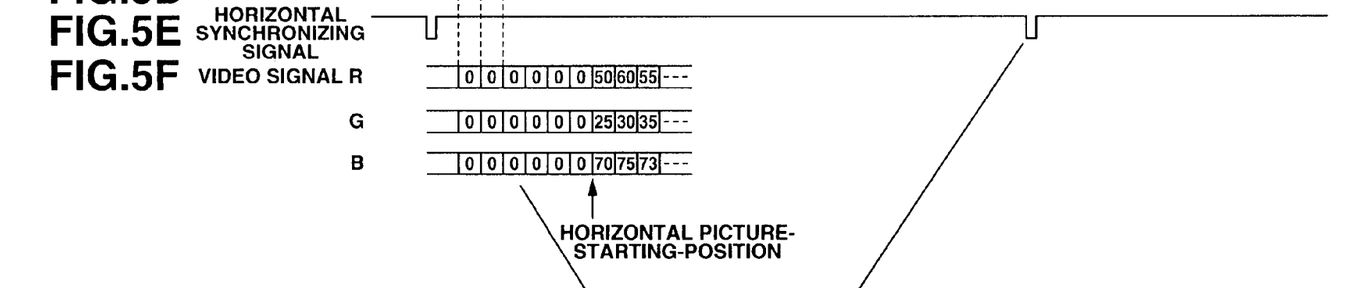
FIG. 5E shows the horizontal synchronizing signal.
FIG. 5F shows the video signals for R, G, and B.

FIGS. 5D to 5F illustrate the horizontal timing at which the video signals R, G, and B are superimposed on the black signal (denoted by '0') generated in the output timing generator 131B. FIG. 5D shows the clock signal generated in the output timing generator 131B, the signal having a period corresponding to one pixel of the display device 15. FIG. 5E shows the horizontal synchronizing signal generated in the output timing generator 131B. FIG. 5E shows one of the horizontal synchronizing periods in FIG. 5A enlarged. The horizontal synchronizing period shown in FIG. 5E shows the period of the horizontal synchronizing signal enlarged including the horizontal picture-starting-position. In the period of the vertical synchronizing period shown in FIG. 5B which corresponds to one screen period. FIG. 5F shows the video signals R, G, and B superimposed on the black signal (denoted by '0') generated in the output timing generator 131B.

In FIGS. 5C and 5F, the arrows indicate the vertical picture-starting-position and the horizontal picture-starting-position, respectively. In FIG. 5F, '0' denotes the level of the video signals R, G, and B in each pixel in the black part; and '50', '25', and '70' denote the level of the video signals R, G, and B, respectively, in the pixel where the video signals start to be superimposed.

As shown in FIGS. 5A to 5C, the horizontal synchronizing periods in the first stage of one vertical synchronizing period are filled with black signals; the video signal is superimposed in the middle stage of each of the horizontal synchronizing periods in the middle stage of one vertical synchronizing period; and the horizontal synchronizing periods in the latter stage of one vertical synchronizing period are filled with black signals. Consequently, the input video signal in FIG. 3 is displayed in the center of the display device 15, as shown in FIG. 4B. Since the level of these signals is represented with 8 bits, the level is in the range of 0 to 255.

FIGS. 6A to 6F are timing charts in the output timing generator 131B illustrating the displaying operation in FIG. 4C.

Figure 6A:
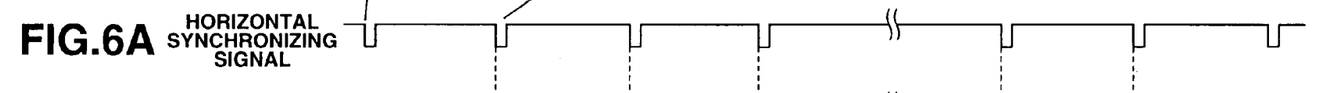
FIG. 6A shows the horizontal synchronizing signal.
Figure 6B:
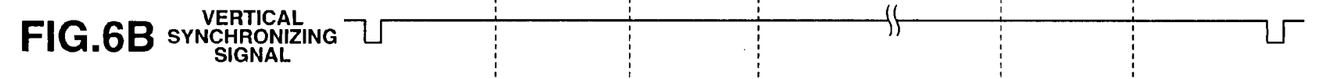
FIG. 6B shows the vertical synchronizing signal.
Figure 6C:
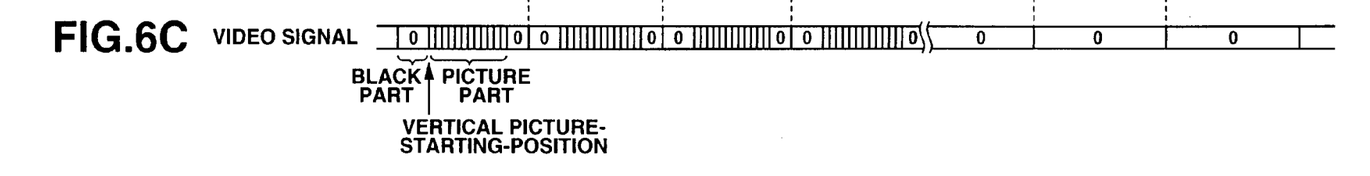
FIG. 6C shows the video signal.

FIGS. 6A to 6C illustrate the vertical timing in which the video signal is superimposed on the black signal (denoted by '0') generated in the output timing generator 131B. FIG. 6A shows the horizontal synchronizing signal generated in the output timing generator 131B. FIG. 6B shows the vertical synchronizing signal generated in the output timing generator 131B. FIG. 6C shows the video signal superimposed on the black signal (denoted by '0') generated in the output timing generator 131B. The arrow indicates the vertical picture-starting-position.

Figure 6D:
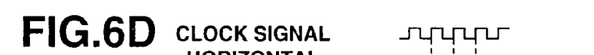
FIG. 6D shows the clock signal.
Figure 6E:
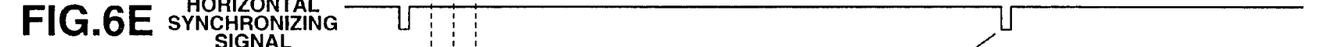
FIG. 6E shows the horizontal synchronizing signal.
Figure 6F:
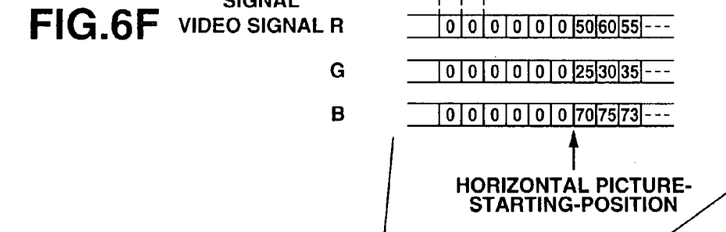
FIG. 6F shows the video signals for R, G, and B.

FIGS. 6D to 6F illustrate the horizontal timing at which the video signals R, G, and B are superimposed on the black signal (denoted by '0') generated in the output timing generator 131B. FIG. 6D shows the clock signal generated in the output timing generator 131B, the signal having a period corresponding to one pixel of the display device 15. FIG. 6E shows the horizontal synchronizing signal generated in the output timing generator 131B. FIG. 6E shows one of the horizontal synchronizing periods in FIG. 6A enlarged. The horizontal synchronizing period shown in FIG. 6E shows the period of the horizontal synchronizing signal enlarged including the horizontal picture-starting-position. In the period of the vertical synchronizing period shown in FIG. 6B which corresponds to one screen period. FIG. 6F shows the video signals R, G, and B superimposed on the black signal (denoted by '0') generated in the output timing generator 131B.

In FIGS. 6C and 6F, the arrows indicate the vertical picture-starting-position and the horizontal picture-starting-position, respectively. In FIG. 6F, '0' denotes the level of the video signals R, G, and B in each pixel in the black part; and '50', '25', and '70' denote the level of the video signals R, G, and B, respectively, in the pixel where the video signals start to be superimposed.

As shown in FIGS. 6A to 6C, the video signal is superimposed in the middle stage of each of the horizontal synchronizing periods in the first stage of one vertical synchronizing period; and the horizontal synchronizing periods in the latter stage of one vertical synchronizing period are filled with black signals. Consequently, the input video signal in FIG. 3 is displayed in the upper center of the display device 15, as shown in FIG. 4C.

In the above embodiment, the video signal input from the PC 21 into the input-video-signal processing unit 12 is the SVGA signal having a number of pixels equal to 800×600 dots. In the case where the signal having a number of pixels equal to, for example, 1600×1200 dots is input, in order to fill the XGA-sized (1024×768) display device 15, it is necessary to perform pixel skipping (N=0.64) in the N-multiplying circuit 131A. In order to display the signal in part of the XGA-sized (1024×768) display device 15, of course, it is necessary to perform further pixel skipping by setting (N<0.64) in the N-multiplying circuit 131A. All of these resizing processes can be performed in the scaler unit 13.

Since the first embodiment has no lens-shifting mechanisms, the cost is reduced. When the number of pixels of the video signal is made smaller than that of the display device with the scaler, the picture displayed on the display device can be shifted vertically and horizontally with the scaler according to the user's operation. Therefore, the range of choice for installation places is expanded.

Second Embodiment

Figure 7A:
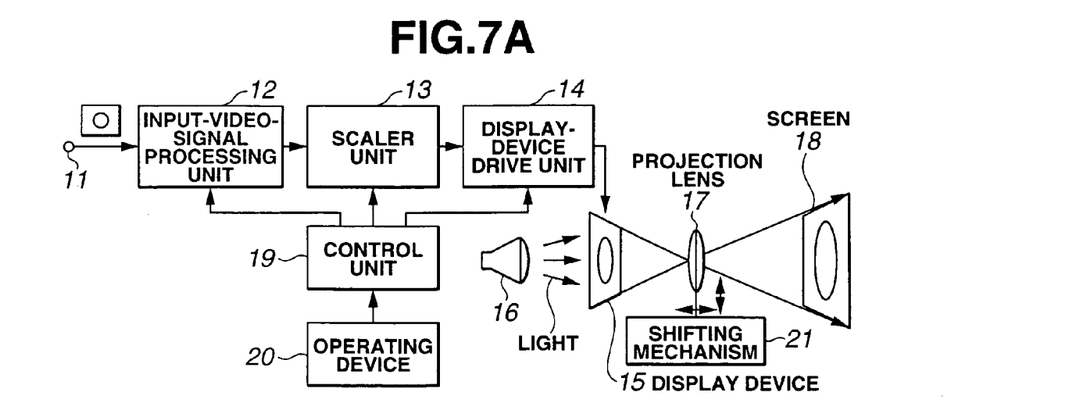
FIG. 7A shows the case where a projection lens is shifted by a shifting mechanism to a predetermined position.
Figure 7B:
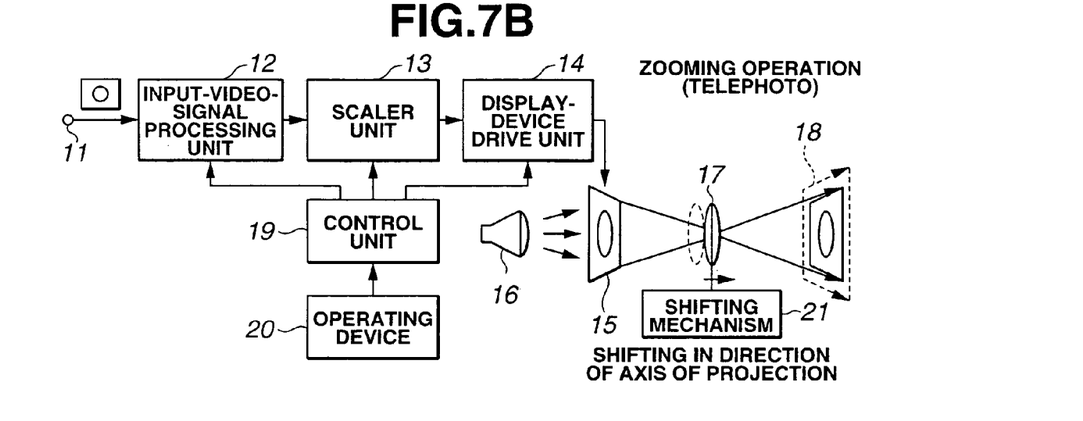
FIG. 7B shows the case where the projection lens is shifted by the shifting mechanism back and forth.
Figure 7C:
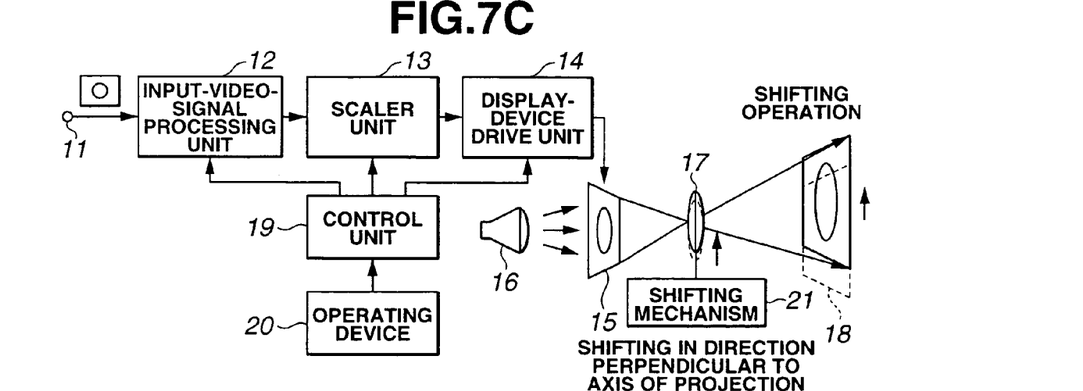
FIG. 7C shows the case where the projection lens is shifted by the shifting mechanism in the vertical direction.

FIGS. 7A to 7C are block diagrams showing an outline of the structure of a video projector of a second embodiment of the present invention.

The second embodiment shown in FIGS. 7A to 7C has a shifting mechanism 21 provided for the projection lens 17 in the first embodiment. Therefore, the second embodiment is capable of optical zooming operation and lens shifting operation. The remaining structure is the same as the first embodiment shown in FIGS. 1A to 1C. The shifting mechanism 21 at least has a mechanism for shifting in the direction of the axis of projection back and forth and a mechanism for shifting in the direction perpendicular to the axis of projection up and down. Therefore, in addition to the digital zooming operation and the digital shifting operation in the first embodiment, the second embodiment is capable of optical zooming operation and lens shifting operation by the shifting mechanism 21.

FIG. 7A is the same as FIG. 1A, except for the shifting mechanism 21 for the lens. The projection lens 17 in FIG. 1A is provided with a shifting mechanism 21 that can move the lens 17 at least in the vertical and horizontal directions. The user manually operates an adjusting device (not shown), such as a dial, for controlling the shifting mechanism 21, thereby performing the optical zooming operation, which can adjust the size of the projected picture, and the lens shifting operation, which can adjust the position of the projected picture.

FIG. 7A shows the projection lens 17 disposed in a predetermined position by the shifting mechanism 21.

FIG. 7B shows that the optical zooming operation, which adjusts the size of the picture projected on the screen 18, is performed by moving the projection lens 17 from the position shown with a dotted line (the lens position in FIG. 1A, for example) in the direction of the axis of projection by the shifting mechanism 21.

FIG. 7C shows that the lens shifting operation, which adjusts the position of the picture projected on the screen 18, is performed by moving the projection lens 17 from the position shown with a dotted line (the lens position in FIG. 1A) in the direction perpendicular to the axis of projection with the shifting mechanism 21.

In addition, as in the first embodiment in FIGS. 1A to 1C, the digital zooming operation and the digital shifting operation can also be performed. As described above, the digital zooming operation scales the number of pixels of the video signal with the scaler unit 13 to a number of pixels equal to or smaller than the number of pixels of the display device 15, thereby adjusting the size of the picture projected on the screen 18. In the case where the number of pixels of the video signal is scaled to a smaller number of pixels than the number of pixels of the display device 15, the digital shifting operation moves the video signal to a desired position in the displayable region on the display device 15, thereby adjusting the position of the picture projected on the screen 18. Therefore, the size and position of the picture projected on the screen 18 can be adjusted both digitally and optically.

In addition to the digital zooming operation and the digital shifting operation in the first embodiment, the second embodiment can perform the optical zooming operation and the lens shifting operation by the shifting mechanism 21 for the projection lens 17. Therefore, the second embodiment can adjust the size and position of the projected picture over a wider range. Consequently, the range of choice for installation places is expanded.

The present invention is useful for an image projector such as a liquid crystal projector and a DMD (trademark) to adjust the size and position of the picture projected on the screen.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A video projector comprising:
    a scaler unit for writing an input video signal into a frame memory, the scaler unit being capable of scaling the number of pixels of the input video signal to any number of pixels when the input video signal is read out from the frame memory;
    a display device for displaying a picture based on the video signal whose number of pixels is scaled by the scaler unit;
    a projection lens for projecting the picture displayed on the display device onto a screen; and
    a control unit for controlling the scaler unit, the scaler unit scaling the number of pixels of the input video signal to a smaller number of pixels than the maximum displayable number of pixels of the display device, the scaler unit shifting the picture displayed on the display device to a desired position in the displayable region on the display device by changing the timing of the vertical and horizontal superimposition of the video signal according to an instruction from an operating device so as to shift the picture projected on the screen.

2. The video projector according to claim 1, wherein the scaler unit comprises:
    an N-multiplying device for scaling the number of pixels of the input video signal by multiplication to a smaller number of pixels than the maximum displayable number of pixels of the display device when the input video signal is read out from the frame memory; and
    an output-timing generating device for changing the timing of the vertical and horizontal superimposition of the video signal according to the position instruction from the operating device so as to shift the picture displayed on the display device to a desired position in the displayable region on the display device.

3. The video projector according to claim 1, further comprising a shifting mechanism capable of shifting the projection lens at least back and forth in the direction of the axis of projection up and down or in the direction perpendicular to the axis of projection.

4. The video projector according to claim 2, further comprising a shifting mechanism capable of shifting the projection lens at least back and forth in the direction of the axis of projection or up and down in the direction perpendicular to the axis of projection.

5. A method for shifting a picture projected on a screen by a video projector, the method comprising:
    writing an input video signal into a frame memory and scaling the number of pixels of the input video signal to a desired number of pixels by using a scaling unit when the input video signal is read out from the frame memory;
    displaying a picture on a display device based on the scaled video signal;
    projecting the picture displayed on the display device onto a screen by using a projection lens;
    scaling the number of pixels of the input video signal to a smaller number of pixels than the maximum displayable number of pixels on the display device by using the scaling unit according to an instruction from an operating device; and
    shifting the picture displayed on the display device to a desired position in the displayable region on the display device by changing the timing of the vertical and horizontal superimposition of the video signal so as to shift the picture projected on the screen according to the instruction from the operating device.

* * * * *